D. M. FRANCISCO.
Improvement in Animal Traps.

No. 121,608.

Patented Dec. 5, 1871.

ATTEST:
Myron H. Church
C. F. Sewell

INVENTOR:
D. M. Francisco
per Atty
Thos. S. Sprague

UNITED STATES PATENT OFFICE.

DUDLEY M. FRANCISCO, OF THREE RIVERS, MICHIGAN.

IMPROVEMENT IN ANIMAL-TRAPS.

Specification forming part of Letters Patent No. 121,608, dated December 5, 1871.

*To all whom it may concern:*

Be it known that I, DUDLEY M. FRANCISCO, of Three Rivers, in the county of St. Joseph and State of Michigan, have invented a new and useful Improvement in Device for Catching Rats and Mice; and I do declare that the following is a true and accurate description thereof, reference being had to the accompanying drawing and to the letters of reference marked thereon and being a part of this specification, in which—

Figure 1:
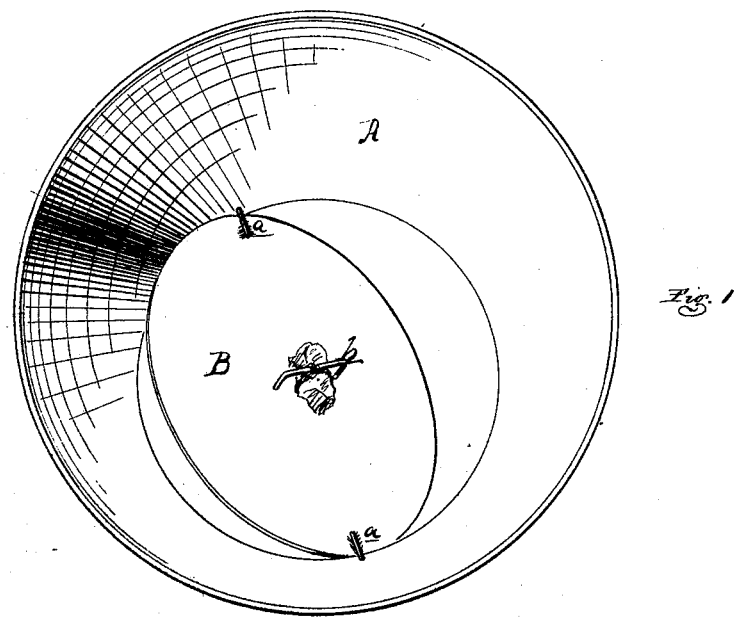
Figure 2:
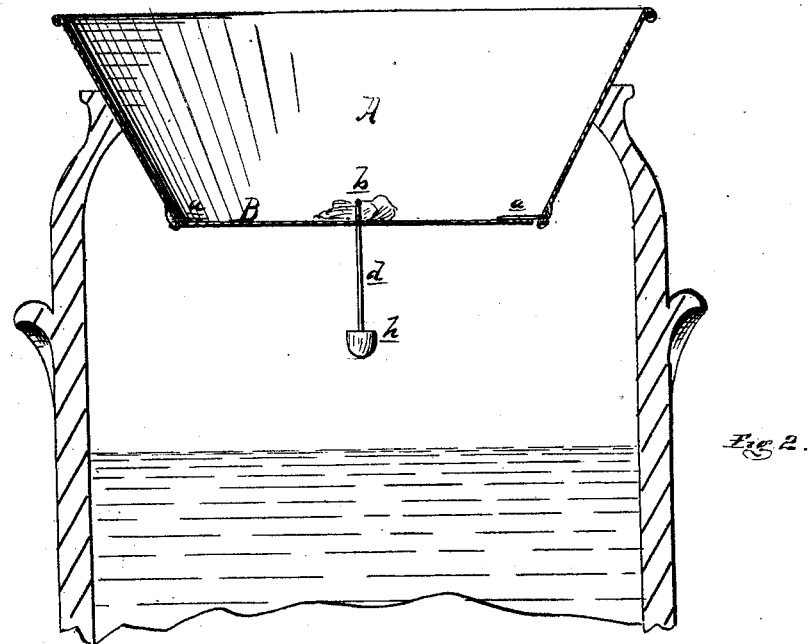

Figure 1 represents a perspective view of my pan from the top, with the bottom or platform partially tilted. Fig. 2 is a vertical section of the same, in position upon the top of a proper receptacle in which the animal is secured.

Like letters refer to like parts in each figure.

The nature of this device relates to a device automatic in its operation, by means of which an unlimited number of rats or mice may be caught without the necessity of attention. The invention consists in the construction and operation of the device, as more fully hereinafter set forth and described.

In the accompanying drawing, A represents an ordinarily-constructed conically-shaped metallic pan, preferably of tin, the bottom B of which is suspended upon pivots $a$, so that said bottom will turn freely upon the same. A hook or catch, $b$, upon the upper side of the bottom is designed to hold any desired bait, as shown. A rod, $d$, projects downward from the center of the tilting bottom, and at the lower end of this rod is secured the weight or ball $h$. I adopt the ordinary form of the common tin pan for the reason that it is familiar in its appearance to rats and mice who frequent dwellings, while they are apt to be suspicious of anything of an unusual character or form. This pan should be set into the top of a crock, C, or any other proper receptacle for holding water, in which the animals are drowned. The animal jumps into the pan to reach the bait, when his weight at once tilts the bottom and he falls into the water below. The weight then causes the bottom to instantly resume its original position.

What I claim as my invention, and desire to secure by Letters Patent, is—

The flaring pan A, provided with tilting bottom B and weight or ball $h$, all constructed substantially as described, and for the purposes set forth.

DUDLEY M. FRANCISCO.

Witnesses:
R. R. PEALER,
SILAS CONNER. (143)